(12) United States Patent
Mei et al.

(10) Patent No.: US 12,061,391 B2
(45) Date of Patent: Aug. 13, 2024

(54) DISPLAY PANEL AND DISPLAY DEVICE (71) Applicant: WUHAN CHINA STAR OPTOELECTRONICS TECHNOLOGY CO., LTD., Hubei (CN)

(72) Inventors: Xindong Mei, Hubei (CN); Wenlong Ye, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 191 days.

(21) Appl. No.: 17/622,002

(22) PCT Filed: Dec. 15, 2021

(86) PCT No.: PCT/CN2021/138390
§ 371 (c)(1),
(2) Date: Dec. 22, 2021

(87) PCT Pub. No.: WO2023/102977
PCT Pub. Date: Jun. 15, 2023

(65) Prior Publication Data
US 2023/0176418 A1  Jun. 8, 2023

(30) Foreign Application Priority Data
Dec. 8, 2021 (CN) .......................... 202111492593.4

(51) Int. Cl.
*G02F 1/13357* (2006.01)
*G02F 1/1335* (2006.01)

(52) U.S. Cl.
CPC .. *G02F 1/133606* (2013.01); *G02F 1/133611* (2013.01); *G02F 1/133612* (2021.01); *G02F 2203/62* (2013.01)

(58) Field of Classification Search
CPC ............. G02F 1/133611; G02F 1/1334; G02F 1/13471; G02F 1/133612; G02F 1/1323;
(Continued)

(56) References Cited

U.S. PATENT DOCUMENTS

2005/0190329 A1* 9/2005 Okumura .............. G02F 1/1323
349/123
2006/0274551 A1* 12/2006 Takada ................. G02B 6/0055
362/611
(Continued)

FOREIGN PATENT DOCUMENTS

CN    105047173 A    11/2015
CN    105301852 B  * 4/2019 ........... G02F 1/1334
(Continued)

OTHER PUBLICATIONS

International Search Report in International application No. PCT/CN2021/138390, mailed on Aug. 31, 2022.
(Continued)

*Primary Examiner* — Hoan C Nguyen
(74) *Attorney, Agent, or Firm* — PV IP PC; Wei Te Chung; Zhigang Ma (57) ABSTRACT

A display panel and a display device are provided. The display panel includes a panel main body. A first dimming element is disposed on a side of the panel main body. The first dimming element has a first alignment direction. A second dimming element is disposed on a side of the panel main body away from the first dimming element or between the first dimming element and the panel body. The second dimming element has a second alignment direction. The first alignment direction is perpendicular to the second alignment direction. The applicability of the display panel is improved, and it has an anti-peeping effect.

13 Claims, 5 Drawing Sheets

(58) Field of Classification Search
CPC ............. G02F 1/133606; G02F 1/1347; G02F 2203/62
See application file for complete search history.

(56) References Cited

U.S. PATENT DOCUMENTS

| | | | |
|---|---|---|---|
| 2007/0146578 | A1 | 6/2007 | Yabuta et al. |
| 2017/0090237 | A1* | 3/2017 | Kim .................... G02F 1/13471 |

FOREIGN PATENT DOCUMENTS

| | | | | | |
|---|---|---|---|---|---|
| CN | 109891308 | A | * | 6/2019 | ......... G02F 1/13306 |
| CN | 110618547 | A | | 12/2019 | |
| CN | 110764322 | A | | 2/2020 | |
| CN | 110780477 | A | | 2/2020 | |
| CN | 111045265 | A | | 4/2020 | |
| CN | 111323946 | A | * | 6/2020 | ........... G02F 1/1323 |
| CN | 211554556 | U | | 9/2020 | |
| CN | 111929943 | A | | 11/2020 | |
| CN | 111965863 | A | | 11/2020 | |
| CN | 112379550 | A | | 2/2021 | |
| CN | 113552741 | A | | 10/2021 | |
| KR | 20040086219 | A | * | 10/2004 | |
| KR | 20140011793 | A | * | 1/2014 | |

OTHER PUBLICATIONS

Written Opinion of the International Search Authority in International application No. PCT/CN2021/138390, mailed on Aug. 31, 2022.

1st Chinese Office Action issued in corresponding Chinese Patent Application No. 202111492593.4 dated May 6, 2022, pp. 1-10.

2nd Chinese Office Action issued in corresponding Chinese Patent Application No. 202111492593.4 dated Oct. 19, 2022, pp. 1-9.

* cited by examiner

DISPLAY PANEL AND DISPLAY DEVICE

CROSS-REFERENCE TO RELATED APPLICATIONS

This application is a 371 U.S. National Phase of International Application No. PCT/CN2021/138390, filed Dec. 15, 2021, which claims priority to Chinese Patent Application No. 202111492593.4, filed Dec. 8, 2021. The entire disclosures of the above applications are incorporated herein by reference.

FIELD OF INVENTION

The present application relates to display technologies, and more particularly, to a display panel and a display device.

BACKGROUND OF INVENTION

In a rapidly developing information age, people are beginning to pay more and more attention to a protection of personal information. With the continuous development of display technology, a type of display device with anti-peeping function has emerged. This type of display device can only allow users in a front viewing angle to view the screen displayed by the display device, while onlookers in the side viewing angle cannot view the display screen, thereby achieving the effect of protecting user privacy At present, a grating structure can be formed on a light-emitting side of the display device, and a viewing angle range of the display device can be reduced through the grating structure, so as to realize an anti-peep function. However, after the grating structure is formed on the light-emitting side of the display device, the display device will always be in a privacy display mode, which makes a display mode of the display device too simple.

SUMMARY OF INVENTION

The embodiment of the present application provides a display panel and a display device. The display panel can be switched between multiple modes by setting a dimming element, which improves an applicability of the display panel and has an anti-peeping effect in a specific mode.

In a first aspect, one embodiment of the present application provides a display panel, including:
  a panel main body;
  a first dimming element disposed on a side of the panel main body, wherein the first dimming element has a first alignment direction; and
  a second dimming element disposed on a side of the panel main body away from the first dimming element or between the first dimming element and the panel main body, wherein the second dimming element has a second alignment direction, and wherein the first alignment direction is perpendicular to the second alignment direction.

In a second aspect, one embodiment of the present application provides a display device, including:
  a display panel according to any one above mentioned embodiment; and
  a backlight module disposed on one side of the display panel.

In a third aspect, one embodiment of the present application also provides another display device, including:
  a display panel according to any one above mentioned embodiment, wherein the display panel further includes a cathode layer, an electron transport layer, a light-emitting layer, a hole transport layer, a polarizing layer, and a substrate stacked in sequence, and wherein the light-emitting layer includes a plurality of light sources, and wherein the plurality of light sources are configured to emit uniform light, and wherein the plurality of light sources are disposed in an array.

The display panel provided by the embodiment of the present application includes a panel main body, a first dimming element and a second dimming element. The first dimming element is disposed on a side of the panel main body. The light element is disposed on a side of the panel main body away from the first dimming element or between the first dimming element and the panel main body. The second dimming element has a second alignment direction. The first alignment direction is perpendicular to the second alignment direction. By setting the dimming element, the display panel can be switched between multiple modes, which improves the applicability of the display panel and has an anti-peeping effect in a specific mode.

DESCRIPTION OF FIGURES

The following detailed description of the specific implementations of the present application in conjunction with the accompanying figures will make the technical solutions of the present application and its beneficial effects obvious.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps shall fall within a protection scope of the present application.

In the related art, there are multiple line-of-sight directions when the user views the display panel, such as a front line-of-sight direction of the display panel viewed from the front, and a side line-of-sight direction of the display panel viewed from the side. The test line direction may include a first line-of-sight direction and a second line-of-sight direction. The first line-of-sight direction may be a line-of-sight direction viewed from a left side of the display panel, and the second line-of-sight direction may be a line-of-sight direction viewed from a right side of the display panel.

In the application process of the normal display panel anti-peeping function, the user can view a screen displayed on the display panel in a front line-of-sight, but cannot view a screen displayed on the display panel in a side line-of-sight. The anti-peeping function is to switch between the front line-of-sight direction and the side line of side direction, and cannot play an anti-peeping effect in a particular line-of-sight direction. For example, in an application scenario such as a vehicle-mounted central control display panel, based on factors such as safety and privacy, the user in a main driving position does not need to view the display screen and affect driving, while the users in the co-pilot position can view the display screen, wherein all of the users in the co-pilot position are in the direction of the side line-of-sight. Therefore, it is necessary to prevent peeping under a certain line-of-sight, such as preventing the main driving position from viewing the display screen.

Figure 1:
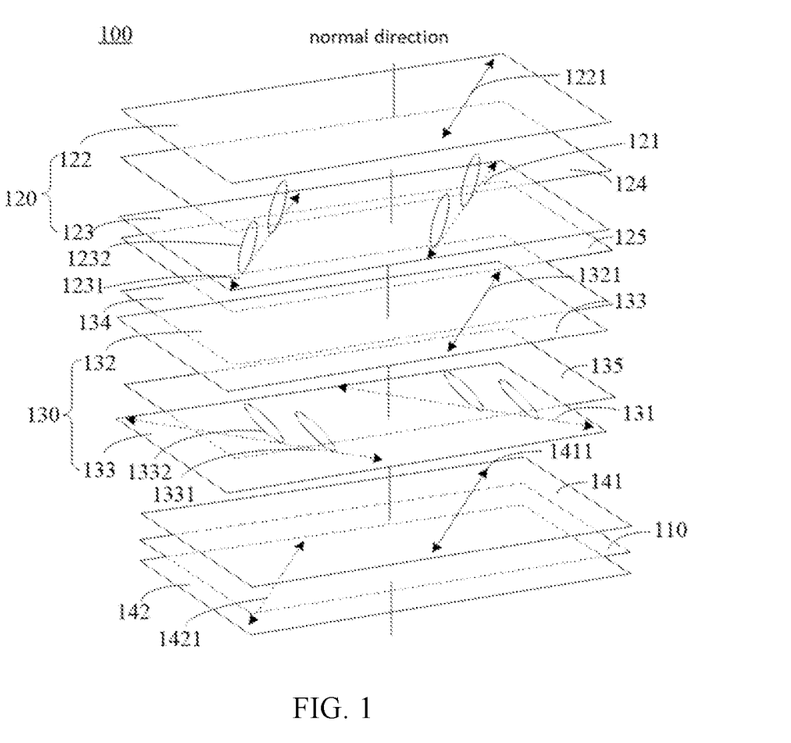
FIG. 1 is a schematic diagram of the first structure of a display panel provided by one embodiment of the present application.
Figure 2:
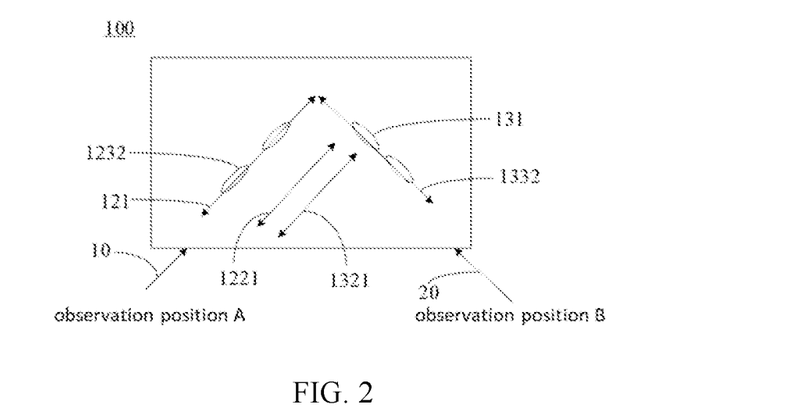
FIG. 2 is a schematic diagram of a first scenario of the display panel provided by one embodiment of the present application.

One embodiment of the present application provides a display panel. Please refer to FIG. 1 and FIG. 2. FIG. 1 is a schematic diagram of a first structure of the display panel provided by one embodiment of the present application. FIG. 2 is a schematic diagram of a first scenario of the display panel provided by one embodiment of the present application. The display panel 100 can be applied to a display device, and the display panel 100 can include a panel main body 110, a first dimming element 120, and a second dimming element 130.

The first dimming element 120 is disposed on a side of the panel body 110, and the first dimming element 120 has a first alignment direction 121. The second dimming element 130 is disposed on a side of the panel main body 110 away from the first dimming element 120, or the second dimming element 130 is disposed between the first dimming element 120 and the panel main body 110. The second dimming element 130 has a second alignment direction 131, wherein the first alignment direction 121 and the second alignment direction 131 are perpendicular to each other. It should be noted that if the display device applied to the display panel 100 is a liquid crystal display device, the first alignment direction 121 corresponding to the first dimming element 120 and the second alignment direction 131 corresponding to the second dimming element 130 are realized by respectively providing alignment layers, and if the display device applied to the display panel 100 is a display device such as an LED or an OLED, there is no need to provide an alignment layer and the display device itself has an alignment direction.

The first dimming element 120, the second dimming element 130, and the panel body 110 can be bonded by a transparent optical glue, such as OCA or OCR. In other embodiments, there is an air gap between the element 130 and the panel body 110.

As shown in FIG. 2, the first line-of-sight direction 10 at the observation position A is perpendicular to the second alignment direction 131 and forms an acute angle with the first alignment direction 121. The second line-of-sight direction 20 at the observation position B is perpendicular to the first alignment direction 121 and forms an acute angle with the second alignment direction. The above-mentioned acute angle may be an included angle of 45 degrees, or may be other viewing angles suitable for the user to view, and is not specifically limited here.

In order to meet the different viewing needs of users with different viewing directions corresponding to different observation positions, the display panel 100 of this embodiment has multiple display modes, such as a sharing mode, a single display mode, and a dual display mode. In the sharing mode, both the first line-of-sight direction 10 and the second line-of-sight direction 20 can receive the display screen of the display panel 100. In the single display mode, the first line-of-sight direction 10 or the second line-of-sight direction 20 can receive the display screen of the display panel 100. In the dual display mode, the first line-of-sight direction 10 and the second line-of-sight direction 20 receive different screens displayed on the display panel 100.

In a first single display mode, the user a in the first line-of-sight direction 10 views the display screen, while the user b in the second line-of-sight direction 20 cannot view the display screen; or in a second single display mode, the user a in the first line-of-sight direction 10 cannot view the display screen, while the user b in the second line-of-sight direction 20 can view the display screen, so that in different single display modes, it can prevent peeping in a certain line-of-sight direction.

Further, based on the realization of the anti-peeping function, if the first line-of-sight direction 10 cannot view the display screen in the second single display mode, and user A wants to view some images through the display panel 100, the display screen in the first line-of-sight direction 10 can be different from the display screen in the second line-of-sight direction 20, to achieve the mutual anti-peeping effect of the two line-of-sight directions, but does not affect the use of the display panel 100 by the users a and b, thereby meeting the viewing needs of different users.

It should be noted that, in this embodiment, when the first dimming element 120 and the second dimming element 130 are not used for dimming, the display panel 100 is in a narrow viewing angle mode. That is, the display screen can be viewed only from the front line-of-sight. When the display panel 100 is in a wide viewing angle mode, that is, in the side view direction, the above-mentioned multiple modes can be switched by the dimming element. For example, both the first dimming element 120 and the second dimming element 130 perform dimming to make the display panel 100 in the sharing mode. The first dimming element 120 performs dimming and the second dimming element 130 does not perform dimming, or the first dimming element 120 does not perform dimming and the second dimming element 130 performs dimming, to make the display panel 100 in a single display mode. The first dimming element 120 and the second dimming element 130 both perform dimming, but the dimming timing sequences of the two are different, so that the display panel 100 is in the dual display mode.

In order to realize the switching of the display panel 100 between the sharing mode, the single display mode, and the dual display mode through the dimming element, please continue to refer to FIGS. 1 and 2. The first dimming element 120 in this embodiment includes a first polarizer 122 and a first dimming liquid crystal layer 123 which are stacked. The first polarizer 122 has a first absorption axis direction 1221, and the first dimming liquid crystal layer 123 includes the first polymer network 1231 and the first liquid crystal molecules 1232 distributed in the first polymer network 1231. The first polymer network 1231 is arranged along the first alignment direction 121. The first alignment direction 121 is parallel to the first absorption axis direction 1221 and inclined with respect to the normal direction of the first polarizer 122. The first liquid crystal molecules 1232 are arranged along an arrangement direction which is the first alignment direction 121 of the first polymer network 1231. The long axis of the first liquid crystal molecules 1232 forms an acute angle with the first alignment direction 121. It should be noted that the first polymer network 1231 arranged along the first alignment direction 121 is obtained during the manufacturing process through the first alignment direction 121, and the first alignment direction 121 is a pretilt direction formed during the alignment process.

The second dimming element 130 includes a second polarizer 132 and a second dimming liquid crystal layer 133. The second polarizer 132 has a second absorption axis direction 1321. The second dimming liquid crystal layer 133 includes a second polymer network 1331 and second liquid crystal molecules 1332 distributed in the second polymer network 1331. The second polymer network 1331 is arranged along the second alignment direction 131. The second alignment direction 131 is perpendicular to the second absorption axis direction 1321, and is inclined relative to the normal direction of the second polarizer 132. The second liquid crystal molecules 1332 are arranged along the arrangement direction of the second polymer network 1331, that is, the second alignment direction 131. The long axis of the second liquid crystal molecules 1332 forms an acute angle with the second alignment direction 131. It should be noted that during the manufacturing process through the second alignment direction 131, the second polymer network 1331 arranged along the second alignment direction 131 will be obtained, and the second alignment direction 131 is a pretilt direction formed during the alignment process.

Further, a first electrode layer 124 is provided between the first polarizer 122 and the first dimming liquid crystal layer 123. A second electrode layer 125 is provided on a side of the first dimming liquid crystal layer 123 away from the first electrode layer 124. When the first electrode layer 124 and the second electrode layer 125 are not electrically conducted, the long axis of the first liquid crystal molecules 1232 is arranged along the first alignment direction 121. When the first electrode layer 124 and the second electrode layer 125 are electrically conducted, the long axis direction of the first liquid crystal molecules 1232 is arranged along the first target direction. The first alignment direction 121 is different from the first target direction. A viewing angle of the display panel 100 when the long axis of the first liquid crystal molecules 1232 is arranged along the first alignment direction 121 is smaller than a viewing angle of the display panel 100 when the long axis direction of the first liquid crystal molecules 1232 is arranged along the first target direction.

It should be noted that when the first electrode layer 124 and the second electrode layer 125 are not electrically conducted, the first light incident along the normal direction of the first polarizer 122 can pass through the first polarizer 122, and the second light incident along the direction oblique to the normal of the first polarizer 122 is blocked or partially blocked by the first polarizer 122. When the first electrode layer 124 and the second electrode layer 125 are electrically conducted, due to the long axis direction of the first liquid crystal molecules 1232 is different from the first alignment direction 121, more light can pass through the first polarizer 122, thereby increasing the viewing angle range of the display panel 100. That is, a viewing angle of the display panel 100 when the long axis direction of the first liquid crystal molecules 1232 is arranged along the first target direction is larger than a viewing angle of the display panel 100 when the long axis of the first liquid crystal molecules 1232 is arranged along the first alignment direction 121. Specifically, when a voltage difference between the first electrode layer 124 and the second electrode layer 125 is less than a first preset threshold, the long axis of the first liquid crystal molecule 1232 is arranged along the first alignment direction 121, and when the voltage difference between the first electrode layer and the second electrode layer is greater than the first preset threshold, the long axis of the first liquid crystal molecules 1232 is arranged along the first target direction. The first preset threshold can be set according to actual needs, and will not be specifically limited here.

In this embodiment, the first polymer network 1231 of the first dimming liquid crystal layer 123 is arranged along the first alignment direction 121, and the first alignment direction 121 is inclined with respect to the normal direction of the first polarizer 122, so as to provide an orientation effect to the first liquid crystal molecule 1232. So that the long axis of the first liquid crystal molecule 1232 is also inclined to the first alignment direction 121. Due to a light deflection characteristic of the first liquid crystal molecule 1232, the first light passes through the first polarizer 122, and the second light is blocked or partially blocked by the first polarizer 122. In this way, the display panel 100 can selectively transmit light from different directions, thereby playing a role of anti-peeping at a specific viewing angle. For example, when the long axis of the first liquid crystal molecules 1232 is arranged along the first alignment direction 121, the light passing through the first polarizer 122 cannot be received by the second line-of-sight direction 20 at the observation position B corresponding to it, to provide an anti-peeping effect to user b.

Since the first light is incident along the normal direction of the first polarizer 122, in a three-dimensional space, the first light and the first liquid crystal molecule 1232 are in a same plane, and a polarization direction of the first light only passes through the long axis of the first liquid crystal molecule 1232. Therefore, after the first light passes through the first dimming liquid crystal layer 123, no phase difference occurs, that is, no deflection occurs, and can pass through the first polarizer 122.

The second light is incident along a direction oblique to the normal direction of the first polarizer 122. In the three-dimensional space, a polarization direction of the second light forms a certain angle with the long axis of the first liquid crystal molecule 1232. Therefore, after the second light passes through the first dimming liquid crystal layer 123, a phase difference will occur, that is, a deflection occurs, and a polarization direction is changed, so that the first polarizer 122 cannot be directly passed through. If the polarization direction of the light deflected by the second light is perpendicular to the arrangement direction of the first polarizer 122, the light will be completely blocked by the first polarizer 122. At this time, only the front line-of-sight can view the screen displayed by the display panel, and the second line-of-sight of the side line-of-sights can prevent peeping. If the polarization direction of the light deflected by the second light and the arrangement direction of the first polarizer 122 forms an acute angle, part of the light decomposed along the arrangement direction of the first polarizer 122 can pass through the first polarizer 122. At this time, the display panel 100 is normally viewed in the front line-of-sight direction, and a display brightness of the display panel 100 in the second line-of-sight direction will be darker.

When the first electrode layer 124 and the second electrode layer 125 are electrically conducted, the first liquid crystal molecules 1232 can be controlled to deflect, so that the first liquid crystal molecules 1232 are arranged along the first target direction, and the first target direction is different from the first alignment direction 121, so that the first dimming element 120 dims the display panel 100.

Figure 3:
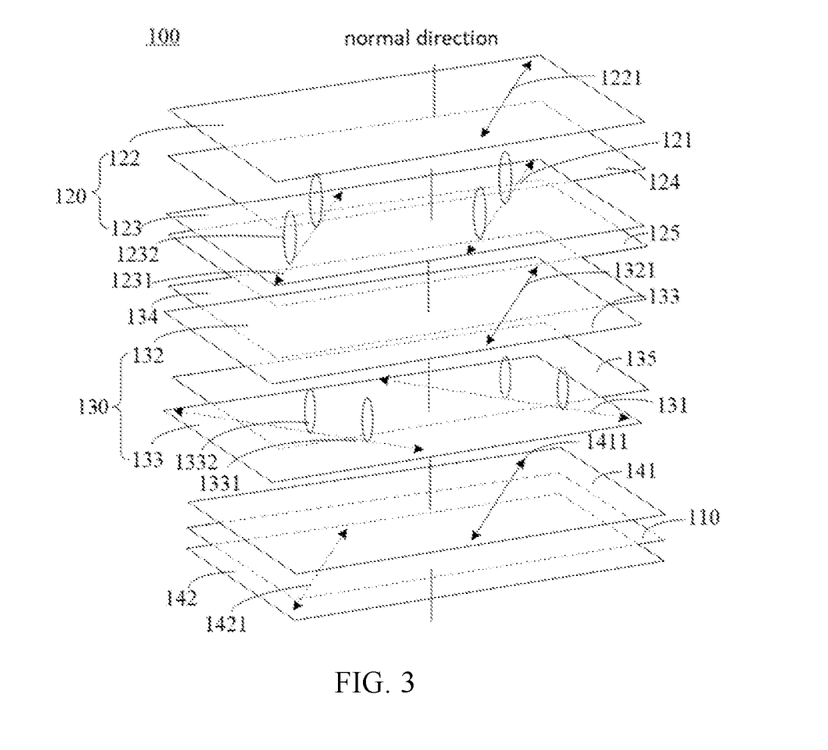
FIG. 3 is a schematic diagram of a second structure of the display panel provided by one embodiment of the present application.

Please refer to FIG. 3, FIG. 3 is a schematic diagram of a second structure of the display panel provided by one embodiment of the present application. When the first liquid crystal molecules 1232 are positive liquid crystals, the first target direction is parallel to the normal direction of the first polarizer 122. At this time, the polarization directions of the first light and the second light are both parallel to the short axis of first liquid crystal molecules 1232. When the first light and the second light pass through the first dimming liquid crystal layer 123, neither the first light nor the second light can be deflected, so both the first light and the second light can pass through the first polarizer 122. Thus, the user b who is in the second line-of-sight direction 20 can view the display screen of the display panel 100.

In addition, when the first liquid crystal molecules 1232 are negative liquid crystals, the first target direction is perpendicular to the normal direction of the first polarizer 122. At this time, the polarization directions of the first light and the second light are both parallel to the long axis of the first liquid crystal molecule 1232. The first light and the second light are not deflected when passing through the first dimming liquid crystal layer 123, so both the first light and the second light can pass through the first polarizer 122. Thus, the user b who is in the second line-of-sight direction 20 can view the display screen of the display panel 100.

It should be noted that after the first electrode layer 124 and the second electrode layer 125 are electrically conducted, since the arrangement direction of the first liquid crystal molecules 1232 is different from the arrangement direction of the first polymer network 1231, when the first light and the second light passes through the first dimming liquid crystal layer 123, both will be scattered, making the viewing angle range of the emitted light more uniform, thereby improving the display effect of the display picture viewed by the user b in the second line-of-sight 20.

Similarly, a third electrode layer 134 is provided between the second polarizer 132 and the second dimming liquid crystal layer 133, and a fourth electrode layer 135 is provided on a side of the second dimming liquid crystal layer 133 away from the third electrode layer 134. When the third electrode layer 134 and the fourth electrode layer 135 are not electrically conducted, the long axis of the second liquid crystal molecules 1332 is arranged along the second alignment direction 131. When the third electrode layer 134 and the fourth electrode layer 135 are electrically conducted, the long axis direction of the second liquid crystal molecules 1332 is arranged along the second target direction. The second alignment direction 131 is different from the second target direction, wherein a viewing angle of the display panel 100 when the long axis of the second liquid crystal molecules 1332 is arranged along the second alignment direction 131 is smaller than a viewing angle of the display panel 100 when the long axis direction of the second liquid crystal molecules 1332 is arranged along the second target direction. Specifically, when a voltage difference between the third electrode layer 134 and the fourth electrode layer 135 is less than the second preset threshold, the long axis of the second liquid crystal molecule 1332 is arranged along the second alignment direction 131, and when a voltage difference between the third electrode layer 134 and the fourth electrode layer 135 is greater than the first preset threshold value, the long axis of the second liquid crystal molecules 1332 is arranged along the second target direction, and the second preset threshold value can be set according to actual needs, and it will not be limited here.

It should be noted that when the third electrode layer 134 and the fourth electrode layer 135 are not electrically conducted, the third light incident along the normal direction of the second polarizer 132 can pass through the second polarizer 132 and the fourth light incident along a direction oblique to the normal direction of the second polarizer 132 is blocked or partially blocked by the second polarizer 132; when the third electrode layer 134 and the fourth electrode layer 135 are electrically conducted, due to the long axis direction of the second liquid crystal molecules 1332 is different from the second alignment direction 131, so that more light can pass through the second polarizer 132, thereby increasing the viewing angle range of the display panel 100. That is, a viewing angle of the display panel 100 when the long axis direction of the second liquid crystal molecules 1332 is arranged along the second target direction is greater than a viewing angle of the display panel 100 when the long axis of the second liquid crystal molecules 1332 are arranged along the second target direction.

In this embodiment, the second polymer network 1331 of the second dimming liquid crystal layer 133 is arranged along the second alignment direction 131, and the second alignment direction 131 is inclined with respect to the normal direction of the second polarizer 132, so as to provide an orientation effect to the second liquid crystal molecule 1332, so that the long axis of the second liquid crystal molecule 1332 is also inclined to the second alignment direction 131. Due to the light deflection characteristic of the second liquid crystal molecule 1332, the third light passes through the second polarizer 132, and the fourth light is blocked or partially blocked by the second polarizer 132. In this way, the display panel 100 can selectively transmit light from different directions, thereby playing a role of anti-peep at a specific viewing angle. For example, when the long axis of the second liquid crystal molecule 1332 is arranged along the second alignment direction 131, the light passing through the second polarizer 132 cannot be received by the first line-of-sight direction 10 at the observation position A corresponding to it, so as to provide an anti-peeping effect on user a.

Since the third light is incident along the normal direction of the second polarizer 132, in the three-dimensional space, the third light and the second liquid crystal molecule 1332 are in a same plane, and the polarization direction of the third light only passes through a long axis of the second liquid crystal molecule 1332. Therefore, after the third light passes through the second dimming liquid crystal layer 133, there is no phase difference, that is, no deflection occurs, and can pass through the second polarizer 132.

The fourth light is incident along a direction oblique to the normal direction of the second polarizer 132. In a three-dimensional space, a polarization direction of the fourth light forms a certain angle with the long axis of the second liquid crystal molecule 1332. Therefore, after the fourth light passes through the second dimming liquid crystal layer 133, there will be a phase difference. That is, a deflection of the fourth light occurs, and a polarization direction of the fourth light is changed, so that the fourth light cannot directly passes through the second polarizer 132. If the polarization direction of the light deflected by the fourth light is perpendicular to the arrangement direction of the second polarizer 132, the light will be completely blocked by the second polarizer 132. At this time, the display panel can only be viewed from the front line-of-sight, and play an anti-peeping effect on the first line-of-sight direction in the side realization direction. If the polarization direction of the light after the fourth light is deflected an acute angle with the arrangement direction of the second polarizer 132, then part of the light decomposed along the arrangement direction of the second polarizer 132 can pass through the second polarizer 132. At this time, the display panel 100 is normally viewed in the front line-of-sight, and the display brightness of the display panel 100 in the first line-of-sight will be darker.

When the third electrode layer 134 and the fourth electrode layer 135 are electrically conducted, the second liquid crystal molecules 1332 can be controlled to deflect, so that the second liquid crystal molecules 1332 are arranged along the second target direction, wherein the second target direction and the second alignment direction 131 are different, so that the second dimming element 130 dims the display panel 100.

Please continue to refer to FIG. 3, when the second liquid crystal molecules 1332 are positive liquid crystals, the second target direction is parallel to the normal direction of the second polarizer 132. At this time, the polarization directions of the third light and the fourth light are both parallel the short axis of the second liquid crystal molecule 1332, the third light and the fourth light are not deflected when passing through the second dimming liquid crystal layer 133, so both the third light and the fourth light can pass through the second polarizer 132. Therefore, the user a who is in the first line-of-sight direction 10 can view the display screen of the display panel 100.

In addition, when the second liquid crystal molecules 1332 are negative liquid crystals, the second target direction is perpendicular to the normal direction of the second polarizer 132. At this time, the polarization directions of the third light and the fourth light are both parallel to the long axis of the second liquid crystal molecule 1332. The third light and the fourth light are not deflected when passing through the second dimming liquid crystal layer 133, so the third light and the fourth light can both pass through the second polarizer 132. So that both the third light and the fourth light can pass through the second polarizer 132. Therefore, the user a who is in the first line-of-sight direction 10 can view the display screen of the display panel 100.

It should be noted that after the third electrode layer 134 and the fourth electrode layer 135 are electrically conducted, since the arrangement direction of the second liquid crystal molecules 1332 is different from the arrangement direction of the second polymer network 1331, therefore the third light and the fourth light will be scattered when passes through the second dimming liquid crystal layer 133, to make the viewing angle range of the emitted light more uniform, thereby improving the display effect of the display screen viewed by the user a in the first line-of-sight direction 10.

Please continue to refer to FIG. 1, a third polarizer 141 and a fourth polarizer 142 are respectively provided on both sides of the panel main body 110. The third polarizer 141 has a third absorption axis direction 1411. The fourth polarizer 142 has a fourth absorption axis direction 1421. The stacking arrangement of the third polarizer 11, the panel main body 110, and the fourth polarizer 142 can realize the normal display function of the panel main body 100. And through the dimming of the dimming element, the display panel 100 can be switched in different display modes, which not only improves the applicability, but also plays a role of anti-peeping.

It should be noted that the first dimming element 120 and the second dimming element 130 may both be arranged on a side of the third polarizer 141 away from the fourth polarizer 142, wherein the first absorption axis direction 1221 and the second absorption axis direction 1321 are parallel to the direction of the third absorption axis 1411. Therefore, the light passing through the third polarizer 141 can completely or partially pass through the first polarizer 122 and the second polarizer 132, thereby realizing the display function of the display panel 100.

It can be understood that when the light is emitted from a side of the third polarizer 141, it means that the third polarizer 141 is disposed on a side of a display surface of the display panel 100. That is, the display screen can be viewed from the side of the third polarizer 141, therefore, the first dimming element 120 and the second dimming element 130 are disposed on the side of the third polarizer 141 away from the fourth polarizer 142.

However, the display panel 100 may also use a side of the fourth polarizer 142 as the display surface. That is, the display screen can be viewed from a side of the fourth polarizer 142. Therefore, both the first dimming element 120 and the second dimming element 130 can be disposed on the side of the fourth polarizer 142 away from the third polarizer 141. In order to realize the display function, the first absorption axis direction 1221 and the second absorption axis direction 1321 are parallel to the fourth absorption axis direction 1421.

Of course, the display panel 100 may also have a double-sided display function. That is, the display screen can be viewed from both sides of the third polarizer 141 and the fourth polarizer 142. Therefore, the first dimming element 120 can be disposed on a side of the third polarizer 141 away from the fourth polarizer 142, and the second dimming element 130 can be disposed on the side of the fourth polarizer 142 away from the third polarizer 141, wherein the first absorption axis direction 1221 is parallel to the third absorption axis direction 1411, the second absorption axis direction 1321 is parallel to the fourth absorption axis direction 1421. The first dimming element 120 can also be disposed on the side of the fourth polarizer 142 away from the third polarizer 141, the second dimming element 130 can be disposed on the side of the third polarizer 141 away from the fourth polarizer 142, wherein the first absorption axis direction 1221 is parallel to the fourth absorption axis direction 1421, and the second absorption axis direction 1321 is parallel to the third absorption axis direction 1411.

It is understandable that only one dimming element, such as the first dimming element 120 or the second dimming element 130, is provided on a side of the display panel 100. After the first dimming element 120 or the second dimming element 130 are electrically conducted, the first liquid crystal molecule 1232 or the second liquid crystal molecules 1332 will be deflected, so that the display screen can be viewed in the second line-of-sight direction 20 or the first line-of-sight direction 10, and achieve the effect of viewing the display screen in the side view direction. When the dimming element 120 or the second dimming element 130 are not electrically conducted, the first liquid crystal molecule 1232 or the second liquid crystal molecule 1332 does not deflect, so that the display screen cannot be viewed in the second line-of-sight direction 20 or the first line-of-sight direction 10, only the front line-of-sight can view the display screen, which plays a role of anti-peeping.

Figure 4:
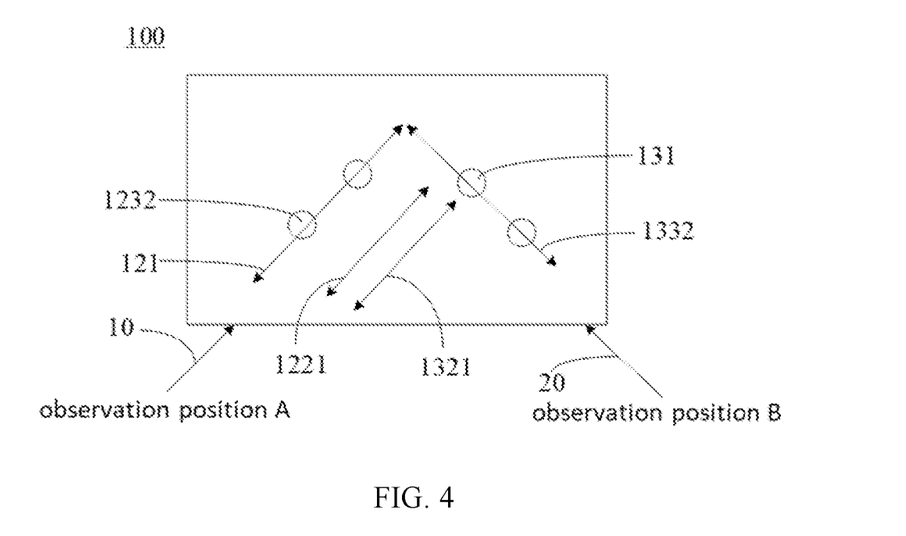
FIG. 4 is a schematic diagram of a second scenario of the display panel provided by one embodiment of the present application.

Please refer to FIGS. 3 and 4. FIG. 4 is a schematic diagram of a second scenario of the display panel provided by one embodiment of the present application. The figure shows a schematic diagram of the display panel 100 in the sharing mode. In the sharing mode, the first electrode layer 124 and the second electrode layer 125 are electrically conducted, so that the long axis of the first liquid crystal molecule 1232 is aligned along the first target direction, and further, the third electrode layer 134 and the fourth electrode layer 135 are electrically conducted, so that the long axis of the second liquid crystal molecule 1332 is disposed along the second target direction. So that both the first line-of-sight direction 10 and the second line-of-sight direction 20 receive the display screen of the display panel 100. The first line-of-sight direction 10 receives the emitted light from the second polarizer 132, and the second line-of-sight direction 20 receives the emitted light from the first polarizer 122, so that the display screen can be viewed in the direction of the frontal line-of-sight and the direction of the side line-of-sight, and the effect of display screen sharing is achieved. Due to the scattering effect of the first liquid crystal molecule 1232 and the second liquid crystal molecule 1332, the viewing angle range of the emitted light is more uniform, so as to further improve the display effect of the image.

Figure 5:
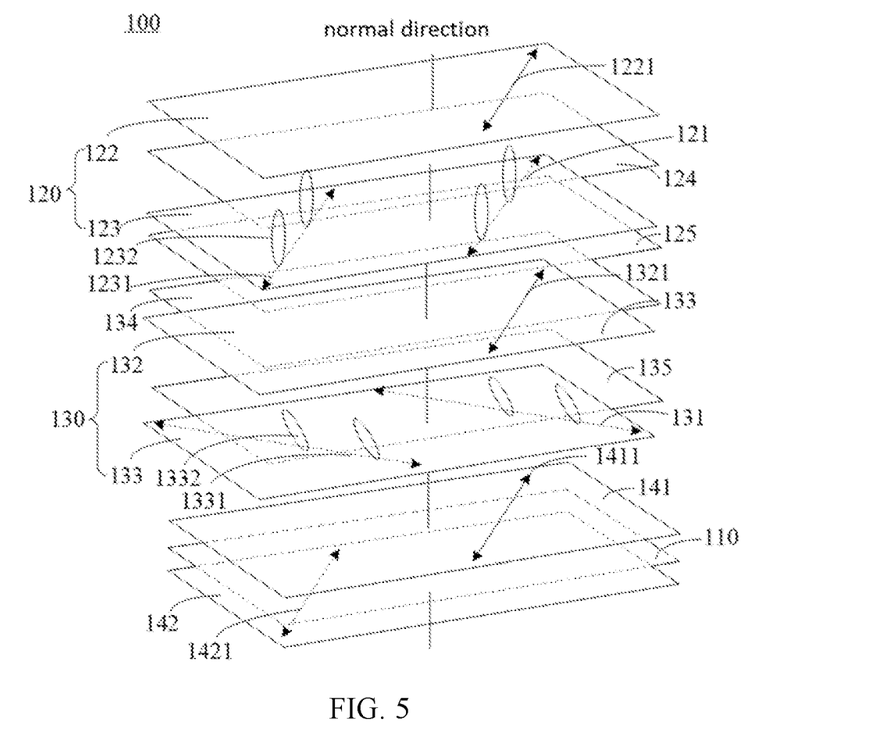
FIG. 5 is a schematic diagram of a third structure of the display panel provided by one embodiment of the present application.
Figure 6:
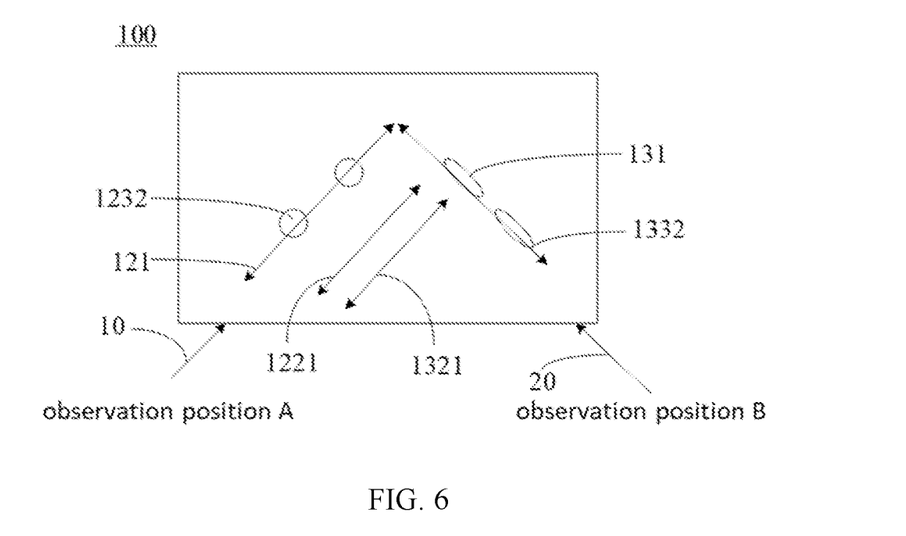
FIG. 6 is a schematic diagram of a third scenario of the display panel provided by one embodiment of the present application.
Figure 7:
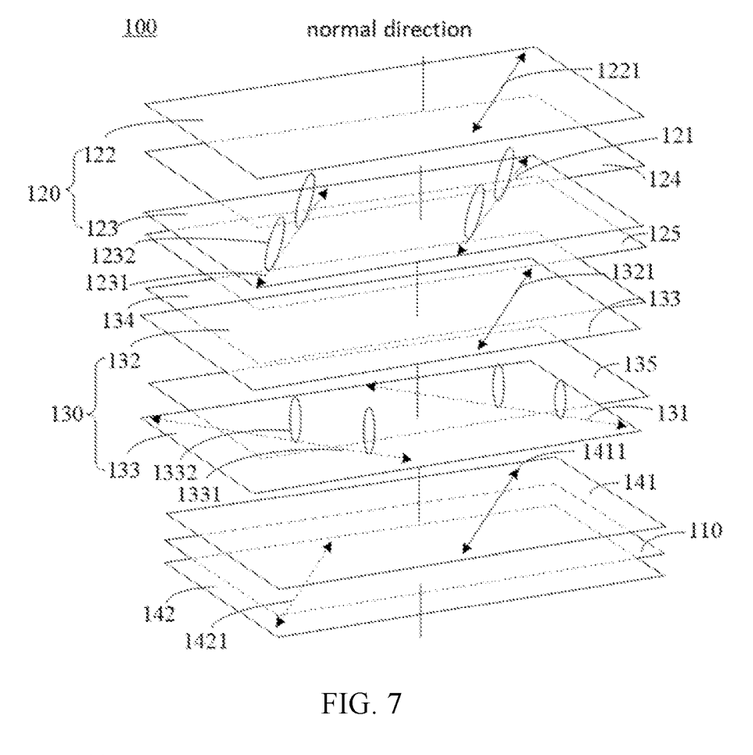
FIG. 7 is a schematic diagram of a fourth structure of the display panel provided by one embodiment of the present application.
Figure 8:
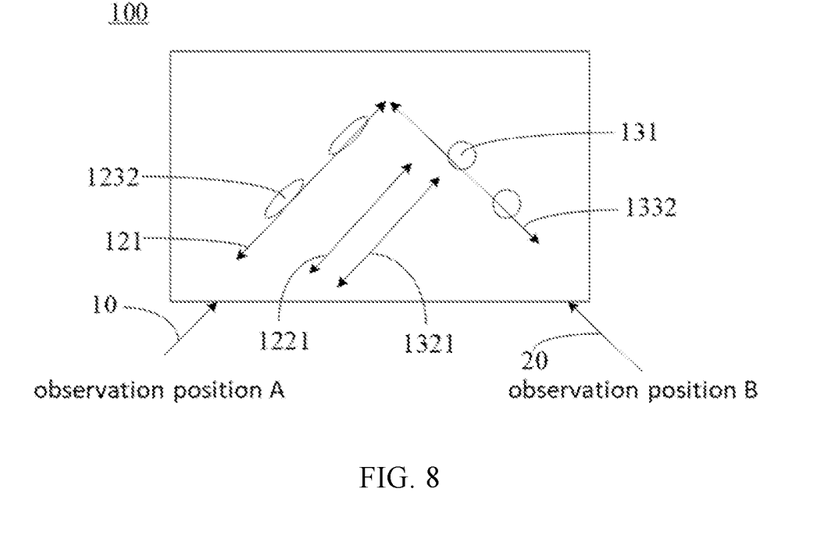
FIG. 8 is a schematic diagram of a fourth scenario of the display panel provided by one embodiment of the present application.

Please refer to FIGS. 5 to 8. FIG. 5 is a schematic diagram of a third structure of a display panel provided by one embodiment of the present application, FIG. 6 is a schematic diagram of a third scenario of the display panel provided by one embodiment of the present application, FIG. 7 is a schematic diagram of a fourth structure of the display panel provided by one embodiment of the present application, FIG. 8 is a schematic diagram of a fourth scenario of the display panel provided by one embodiment of the present application. The figure shows a schematic diagram of the display panel 100 in a single display mode. The single display mode may include a first single display mode and a second single display mode. In the first single display mode, the first electrode layer 124 and the second electrode layer 125 are electrically conducted, so that the long axis of the first liquid crystal molecules 1232 are arranged along the first target direction, and the third electrode layer 134 and the fourth electrode layer 135 are not electrically conducted, the long axis of the second liquid crystal molecules 1332 is arranged along the second alignment direction 131, so that the second line-of-sight direction 20 receives the display screen, and in the side line-of-sight direction, only the second line-of-sight direction 20 can receive the display screen, thereby realizing the anti-peeping effect of the first line-of-sight direction 10.

In the same way, in the second single display mode, first electrode layer 124 and the second electrode layer 125 are not electrically conducted, so that the long axis of the first liquid crystal molecule 1232 is arranged along the first alignment direction 121, and the third electrode layer 134 and the fourth electrode layer 135 are not electrically conducted, so that the long axis of the second liquid crystal molecule 1332 is arranged along the second target direction, so that the first line-of-sight direction 10 receives the display screen, and there is only the first line-of-sight direction 10 in the side line-of-sight direction can receive the display screen, so as to realize the anti-peeping effect of the second line-of-sight direction 20.

Please continue to refer to FIGS. 3 to 8. In the dual display mode, the first electrode layer 124 and the second electrode layer 125 are electrically conducted, so that the long axis of the first liquid crystal molecule 1232 is arranged along the first target direction, and the third electrode layer 134 and the fourth electrode layer 135 are electrically conducted, so that the long axis of the second liquid crystal molecule 1332 is arranged along the second target direction, so that both the first line-of-sight direction 10 and the second line-of-sight direction 20 receive the display screen of the display panel 100. However, different from the sharing mode, a time sequence of the energization between the first electrode layer 124 and the second electrode layer 125 is different from a time sequence of the energization between the third electrode layer 134 and the fourth electrode layer 135, alternately energize frame by frame according to the number of frames displayed, so that the images displayed on the display panel 100 received in the first line-of-sight direction 10 and the second line-of-sight direction 20 are different. It can be seen from FIGS. 6 and 8, the dual display mode is obtained by alternately energizing the single display mode.

Specifically, when the first dimming element 120 is energized, the second dimming element 130 is not energized, and the second dimming element 130 is energized again in the next frame; while when the second dimming element 130 is energized, the first dimming element 120 is not energized, and the first dimming element 120 is energized again in the next frame. In other words, the time sequence of energizing the first dimming element 120 and the second dimming element 130 is alternately cyclically energized according to the number of frames of the display screen, and the display screens corresponding to the first line-of-sight direction 10 and the second line-of-sight direction 20 are also alternated frame by frame. So that the picture displayed in the first line-of-sight direction 10 has an anti-peeping effect on the second line-of-sight direction 20, and the picture displayed in the second line-of-sight direction 20 has an anti-peeping effect on the first line-of-sight direction 10. Therefore, through the same display panel 100 realize the different viewing needs of different users, so as to be suitable for more application scenarios.

A display frequency of the corresponding display screen in the sharing mode can be same as a display frequency of the corresponding display screen the single display mode can be the same, and the display frequency of the corresponding display screen in the dual display mode can be two times the display frequency of the display screen corresponding to the sharing mode and/or single display mode.

It can be seen from the above that the display panel 100 of this embodiment is provided with the first dimming element 120 and the second dimming element 130 to dim the display panel 100, so that the display panel 100 can switch in the sharing mode, the single display mode, and the dual display mode, which improves the applicability of the display panel 100 and has an anti-peeping effect in a specific mode, such as the single display mode and the dual display mode.

Figure 9:
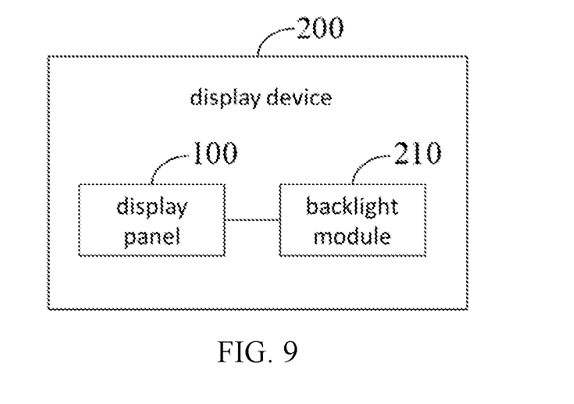
FIG. 9 is a schematic structural diagram of the display device provided by one embodiment of the present application.

One embodiment of the present application also provides a display device. Please refer to FIG. 9. FIG. 9 is a schematic structural diagram of the display device provided by one embodiment of the present application. The display device 200 may be a liquid crystal display device LCD or the like, and the display device 200 may include a display panel 100 and a backlight module 210.

The display panel 100 may include a panel main body 110, a first dimming element 120 and a second dimming element 130. For the specific features of the display panel 100, please refer to the above-mentioned embodiment, which will not be repeated here.

The backlight module 210 is disposed on one side of the display panel 100. Specifically, if the first dimming element 120 and the second dimming element 130 are disposed on a same side of the panel main body 110, the backlight module 210 is disposed on a side of the display main body 110 away from the first dimming element 120 and the second dimming element 130. If the first dimming element 120 and the second dimming element 130 are disposed on different sides of the panel main body 110, the backlight module 210 includes the first backlight module and the second backlight module. The first backlight module is disposed between the first dimming element 120 and the panel main body 110, and the second backlight module is disposed between the second dimming element 130 and the panel main body 110.

The backlight module 210 may provide a backlight source for the display panel 100, and the backlight module 210 may include a collimated backlight source, so that in the display device 200, when the dimming element in the display panel 100 is not dimming, an amount of light incident along the the normal direction of the first polarizer 122 and the normal direction of the second polarizer 132 can be increased, and the display brightness of the display picture viewed in the front line-of-sight can be increased. When the first dimming element 120 and/or the second dimming element 130 in the display panel 100 performs dimming, due to the arrangement direction of the first liquid crystal molecules 1232 and/or the second liquid crystal molecules 1332 is different from the arrangement direction of the first polymer network 1231 and/or the second polymer network 1331, it will scatter the light passing through the first dimming liquid crystal layer 123 and/or the second dimming liquid crystal layer 133, to make the light emission of the collimated backlight source to improve the visibility of the large viewing angle in the side view direction and improve the display effect.

It should be noted that the backlight module 210 is not limited to the collimated backlight source, and may also be other conventional backlight sources such as an edge backlight source, etc., which is not specifically limited herein.

In addition, the embodiments of the present application also provide another display device, and the display device may be a self-luminous display device such as an LED or an OLED. The display device may include a display panel. The display panel may include a cathode layer, an electron transport layer, a light-emitting layer, a hole transport layer, a polarizing layer, and a substrate stacked in sequence. The light-emitting layer may also be a pixel layer. The light-emitting layer includes a plurality of light sources and a light source body. The plurality of light sources are disposed on the light source body. The plurality of light sources are configured to emit uniform light. The plurality of light sources are disposed in an array, such as a dot matrix.

For the specific features of the display panel, please refer to the above-mentioned embodiments, which will not be repeated here.

In the above-mentioned embodiments, the description of each embodiment has its own focus. For parts that are not described in detail in an embodiment, reference may be made to related descriptions of other embodiments.

The display panel and display device provided by the embodiments of the application are described in detail above. Specific examples are used in this specification to illustrate the principles and implementations of the present application. The descriptions of the above embodiments are only used to help understand the methods and core ideas of the present application. Meanwhile, for those skilled in the art, based on the ideas of the present application, there will be changes in a specific implementation and a scope of application. In summary, the content of this specification should not be construed as a limitation of the present application.

What is claimed is:

1. A display panel, comprising:
a panel main body;
a first dimming element disposed on a side of the panel main body, having a first alignment direction, and comprising a first polarizer, a first electrode layer, a first dimming liquid crystal layer, and a second electrode layer stacked in sequence, wherein the first polarizer has a first absorption axis direction, the first dimming liquid crystal layer comprises a plurality of first liquid crystal molecules, the first alignment direction is parallel to the first absorption axis direction and is inclined with respect to a normal direction of the first polarizer,
when the first electrode layer and the second electrode layer are not electrically conducted, a long axis of the first liquid crystal molecule is arranged along the first alignment direction;
when the first electrode layer and the second electrode layer are electrically conducted, the long axis of the first liquid crystal molecule is arranged along a first target direction; and a viewing angle of the display panel when the long axis direction of the first liquid crystal molecules is arranged along the first target direction is greater than a viewing angle of the display panel when the long axis of the first liquid crystal molecules is arranged along the first alignment direction; and
a second dimming element disposed on a side of the panel main body away from the first dimming element or between the first dimming element and the panel main body, having a second alignment direction, and comprising a second polarizer, a third electrode layer, a second dimming liquid crystal layer, and a fourth electrode layer stacked in sequence, wherein the second polarizer has a second absorption axis direction, the second dimming liquid crystal layer comprises a plurality of second liquid crystal molecules, the second alignment direction is perpendicular to the first alignment direction and the second absorption axis direction and is inclined with respect to a normal direction of the second polarizer;
when the third electrode layer and the fourth electrode layer are not electrically conducted, a long axis of the second liquid crystal molecule is arranged along the second alignment direction;
when the third electrode layer and the fourth electrode layer are electrically conducted, the long axis of the second liquid crystal molecule is arranged along a second target direction; and a viewing angle of the display panel when the long axis direction of the second liquid crystal molecules is arranged along the second target direction is greater than a viewing angle of the display panel when the long axis of the second liquid crystal molecules is arranged along the second alignment direction;
wherein the display panel is selectively operated in a first single display mode that the first electrode layer and the second electrode layer are electrically conducted, and the third electrode layer and the fourth electrode layer are not electrically conducted; or
in a second single display mode that the first electrode layer and the second electrode layer are not electrically conducted, and the third electrode layer and the fourth electrode layer are electrically conducted; or
in a dual display mode that a time sequence of energization between the first electrode layer and the second electrode layer and a time sequence of energization between the third electrode layer and the fourth electrode layer alternate frame by frame.

2. The display panel according to claim 1, wherein the first dimming liquid crystal layer further comprises a first polymer network arranged along the first alignment direction, and the first liquid crystal molecules are distributed in the first polymer network.

3. The display panel according to claim 1, wherein the second dimming liquid crystal layer further comprises a second polymer network arranged along the second alignment direction, and the second liquid crystal molecules are distributed in the second polymer network.

4. The display panel according to claim 1, wherein in a sharing mode, the first electrode layer and the second electrode layer are electrically conducted, and the third electrode layer and the fourth electrode layer are electrically conducted.

5. The display panel according to claim 1, wherein in a narrow viewing angle mode, the first electrode layer and the second electrode layer are not electrically conducted, and the third electrode layer and the fourth electrode layer are not electrically conducted.

6. The display panel according to claim 1, wherein a third polarizer and a fourth polarizer are respectively provided on both sides of the panel main body, and wherein the third polarizer has a third absorption axis direction, and the fourth polarizer has a fourth absorption axis direction.

7. The display panel according to claim 6, wherein the first dimming element and the second dimming element are both arranged on a side of the third polarizer away from the fourth polarizer, and wherein the first absorption axis direction and the second absorption axis direction are parallel to the third absorption axis direction.

8. The display panel according to claim 6, wherein the first dimming element and the second dimming element are both disposed on a side of the fourth polarizer away from the third polarizer, and wherein the first absorption axis direction and the second absorption axis direction are parallel to the fourth absorption axis direction.

9. The display panel according to claim 6, wherein the first dimming element is disposed on a side of the third polarizer away from the fourth polarizer, and wherein the second dimming element is disposed on a side of the fourth polarizer away from the third polarizer, and wherein the first absorption axis direction is parallel to the third absorption axis direction, and wherein the second absorption axis direction is parallel to the fourth absorption axis direction.

10. The display panel according to claim 6, wherein the first dimming element is disposed on a side of the fourth polarizer away from the third polarizer, and wherein the second dimming element is disposed on a side of the third polarizer away from the fourth polarizer, and wherein the first absorption axis direction is parallel to the fourth absorption axis direction, and wherein the second absorption axis direction is parallel to the third absorption axis direction.

11. The display panel according to claim 1, wherein the first dimming element, the second dimming element, and the panel main body are bonded by a transparent optical glue, or there is an air gap between the first dimming element, the second dimming element, and the panel main body.

12. A display device, comprising:
the display panel according to claim 1; and
a backlight module disposed on a side of the display panel.

13. The display device according to claim 12, wherein the backlight module comprises a collimated backlight source.

* * * * *